United States Patent
Barnett

(10) Patent No.: US 9,509,934 B2
(45) Date of Patent: Nov. 29, 2016

(54) DEVICE CONTROL INTERFACE CABLE AND ASSOCIATED CONTROL SYSTEMS

(71) Applicant: BBY SOLUTIONS, INC., Richfield, MN (US)

(72) Inventor: David Barnett, Minneapolis, MN (US)

(73) Assignee: BBY Solutions, Inc., Richfield, MN (US)

( * ) Notice: Subject to any disclaimer, the term of this patent is extended or adjusted under 35 U.S.C. 154(b) by 336 days.

(21) Appl. No.: 14/200,906

(22) Filed: Mar. 7, 2014

(65) Prior Publication Data

US 2015/0256785 A1 Sep. 10, 2015

(51) Int. Cl.
*G06F 13/12* (2006.01)
*G06F 13/38* (2006.01)
*H04N 5/44* (2011.01)
*H04N 21/422* (2011.01)
*H04N 21/436* (2011.01)

(52) U.S. Cl.
CPC ...... *H04N 5/4403* (2013.01); *H04N 21/42206* (2013.01); *H04N 21/43615* (2013.01); *H04N 2005/4428* (2013.01); *H04N 2005/4433* (2013.01)

(58) Field of Classification Search
None
See application file for complete search history.

(56) References Cited

U.S. PATENT DOCUMENTS

| | | | | |
|---|---|---|---|---|
| 5,737,364 A | * | 4/1998 | Cohen | G06F 13/385 333/25 |
| 8,769,038 B2 | * | 7/2014 | Montoya | G06F 11/2294 701/31.4 |
| 2005/0057320 A1 | * | 3/2005 | Brandt | H02J 13/002 333/24 R |
| 2008/0136716 A1 | * | 6/2008 | Annamaa | H01Q 1/22 343/702 |
| 2010/0124412 A1 | * | 5/2010 | King | G03B 17/00 396/56 |
| 2011/0134339 A1 | * | 6/2011 | Butler | H04N 5/642 348/734 |
| 2011/0205965 A1 | * | 8/2011 | Sprigg | G06F 9/4411 370/328 |
| 2014/0131182 A1 | * | 5/2014 | Leccia | H02B 11/28 200/238 |

OTHER PUBLICATIONS

"Cat5 to 3.5mm and Cat6 to Stereo—Cat5Adapters.com", [online]. [retrieved on Mar. 27, 2014]. Retrieved from the Internet: <URL: http://www.cat5adapters.com/index.html>, (Mar. 27, 2014), 2 pgs.
"Ex-Link Cable for C/D/E/ Series and BD Players", [online]. [retrieved on Mar. 27, 2014]. Retrieved from the Internet: <URL: http://wiki.samygo.tv/index.php5/Ex-Link_Cable_for_C/D/E_Series_and_BD_players>, (Mar. 27, 2014), 11 pgs.

(Continued)

*Primary Examiner* — Michael Sun
(74) *Attorney, Agent, or Firm* — Schwegman Lundberg & Woessner, P.A.

(57) ABSTRACT

Methods and implementations of using a device interface cable assembly are described herein. In some examples, a modular cable and device interface cable assembly may connect a control system such as a home automation control system to a device control port on a device such as a television. A controller device may use the device interface cable assembly and modular cable to send or receive commands and status messages to or from a remote device. Customized commands may provide direct access to all of the functionality in the remote device, and may avoid the need to navigate a series of menus on the remote device. The modular cable and device interface cable assembly may provide two-way communication between the control system and the remote device. Two-way communication may include verification of command message or gestures, or may include retrieval of remote device status information.

16 Claims, 5 Drawing Sheets

(56) References Cited

OTHER PUBLICATIONS

"Headphone Jack to 3.5mm Audio Balun Extender Over Cat5", [online]. © 1996-2014 Amazon.com, Inc. [retrieved Mar. 27, 2014]. Retrieved from the Internet: <URL: http://www.amazon.com/Headphone-Jack-3-5mm-Audio-Balun/dp/B00D0E206A/>, (Mar. 27, 2014.), 4 pgs.

"Remote Central.com—Custom Installers' Lounge Forum", [online]. © 1998-2014, Daniel Tonks [retrieved on Mar. 27, 2014]. http://www.remotecentral.com/cgi-bin/mboard/rc-custom/thread.cgi?19083>, (Mar. 27, 2014), 8 pgs.

"Samsung Ex-link RS-232 Control", Power Point Presentation (Work Book 2011 ver 1_4), (2013), 11 pgs.

"Samsung LED TV—serial control—help", [online]. © 2013 MediaPortal [retrieved on Mar. 27, 2014]. Retrieved from the Internet: <URL: http://forum.team-mediaportal.com/threads/samsung-led-tv-serial-control-help.91088/>, (Mar. 27, 2014.), 11 pgs.

"Stereo Mini 3.5mm Audio Balun Extender Over Cat5 Cat5E Cat6 Cable", [online], © 1995-2014 Ebay Inc. [retrieved on Mar. 27, 2014]. Retrieved from the Internet: <URL: http://www.ebay.com/itm/Stereo-Mini-3-5mm-Audio-Balun-Extender-Over-Cat5-Cat5E-Cat6-Cable/310443322658>, (Mar. 27, 2014), 3 pgs.

\* cited by examiner

DEVICE CONTROL INTERFACE CABLE AND ASSOCIATED CONTROL SYSTEMS

TECHNICAL FIELD

Embodiments pertain to device interface cable assembly units, electronic device control interfaces, and home automation control applications. Some embodiments relate to configurations and cables used in home automation software applications and implemented processes that enable sending and receiving control and status messages for audiovisual equipment.

BACKGROUND

Some televisions include a control port on the back of the television housing. This control port may be used by a remote service center to run automated tests, where the service center may send commands to run diagnostics. This remote service center port may also be used for receiving commands that directly control the device, such as the receipt of commands that turn the television on and off.

Some televisions may receive and process inputs to control various device functions, received from sources such as from a remote control or from an external control system. Functionality may include adjusting channel, volume, or power state (e.g., turning the television on or off). Existing solutions to adjust the power state may utilize infrared (IR) commands, from conventional television remote controls. However, conventional IR television remote controls require a clear line of sight to control the television. When a television is located in room remote from the control system, there may be no line of sight available. Existing control system solutions may use a cable terminated with an IR flasher (e.g., IR blaster, IR repeater) to convey and convert a signal from a control system into an IR signal. However, the IR flasher must be positioned within a clear line of sight of the television's IR receiver, which may require the IR flasher to be affixed to the front of the television using an adhesive. For consumers concerned with the television's aesthetic appeal, it may be undesirable to affix an IR flasher to the front of the television.

DETAILED DESCRIPTION

Figure 1:
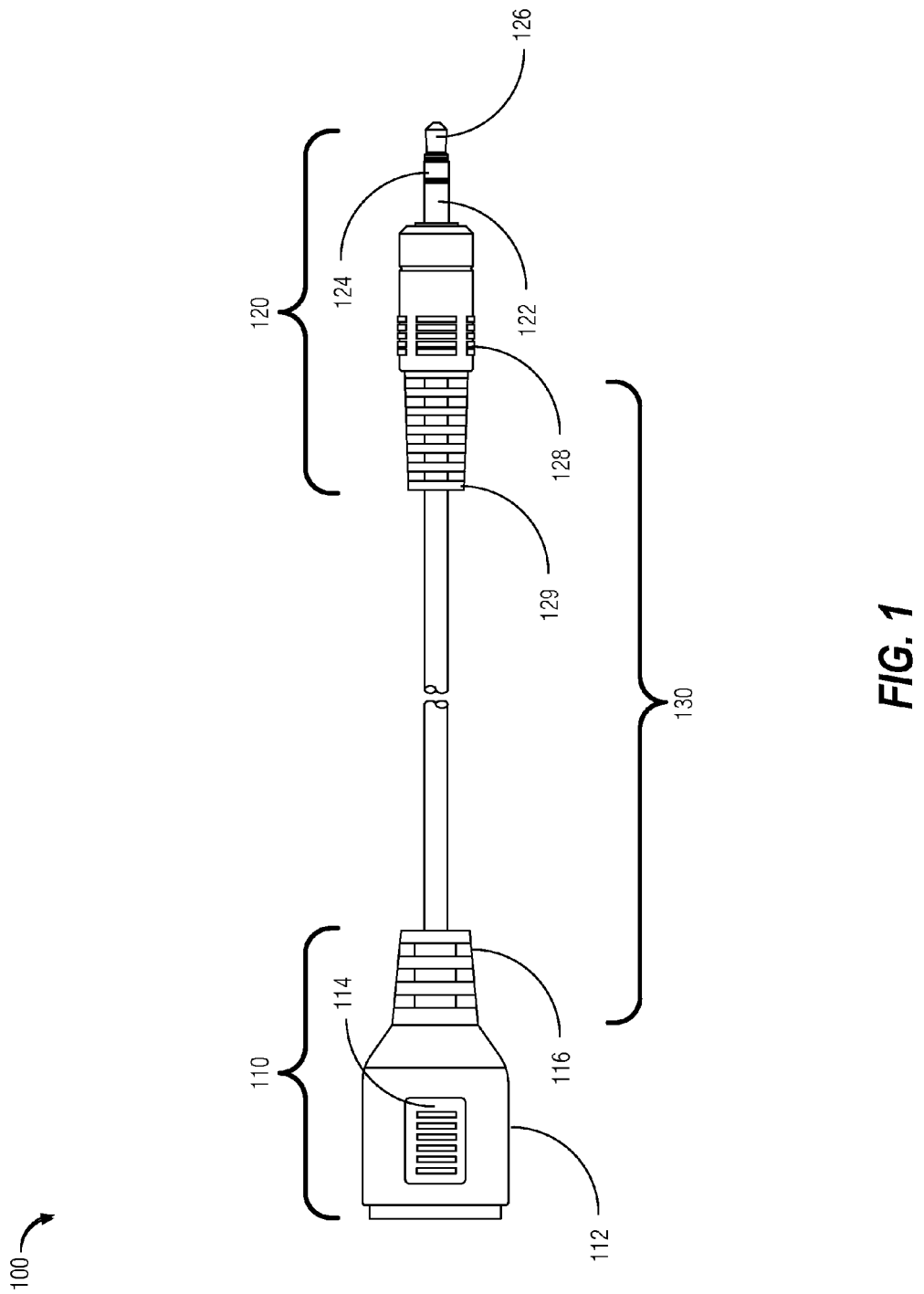
FIG. 1 illustrates a device interface cable assembly with a straight connector according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the embodiments discussed herein describe systems and methods for using a device interface cable assembly. In some examples, a device interface cable assembly may allow various home automation control systems (e.g., Control4, AMX, Savant, or RTI-brand control systems) to connect to a rear-panel, three-conductor 3.5 mm stereo audio control port of an electronic device (e.g., a port to receive a 3.5 mm stereo barrel connector plug, commonly referred to as a TRS, or Tip, Ring, Sleeve plug). This control port may be embodied by a barrel connector jack that is located on various televisions (e.g., an ExLink port on select Samsung televisions), which can receive a plug from a modular cable (e.g., twisted pair cables terminated with modular connectors) embodied by the device interface cable assembly.

An external control system such as a home automation system may use the device interface cable assembly to transmit and receive commands with the device, and control the device remotely. Using a device interface cable assembly may reduce installation cost and complexity, and may result in a more reliable or functioning home automation system. In some examples, a home automation system may improve its ability to control televisions in a larger or high-end system, especially a system including two or more controllable television displays. This cable assembly may be especially useful when television has been mounted on a wall and the home automation control system is in a remote location (e.g., not located within line-of-sight of the television). If the device interface cable assembly is used in commercial applications, where the televisions are in a public space, the system reliability is greatly improved, as in this environment there is a greater risk of the IR flasher becoming dislodged from its mounting location intentionally or unintentionally by staff or the public who may touch the television.

The cable assembly and modular cable may connect an 8P8C control port on the home automation control system to a 3.5 mm TRS port on the television, where the communication between the home automation control system and television may use the RS-232 protocol. The cable assembly may map a home automation controller's three control terminals (ground, transmit, receive) to the television's control terminals (ground, transmit, receive). The cable assembly may be used to avoid complex diagnostic testing for correct pin assignments of control signals, and may eliminate field-fabrication of modular cables using bulk Category-type twisted pair cables or cabling (e.g., Ethernet cable, CAT5e cable, CAT6 cable) terminated with modular connectors (e.g., 8P8C, 6P6C, 4P4C). To connect to the cable assembly, an 8-conductor twisted pair modular cable may be used between the controller location and the television location, where each end of the cable is terminated with industry-standard male 8P8C RJ45 crimp plugs wired in a straight-through fashion. One end of the modular cable may be connected to the female 8P8C jack end of the cable assembly and then plug the male 3.5 mm end of the cable assembly into the television's control port. At the control system (e.g., a home automation control system system), the modular cable may be terminated with a male 8P8C plug, and the plug may be inserted into the 8P8C jack (or otherwise converted to another interface) at the control system.

Existing approaches for connecting controllable televisions with home automation systems may require considerable time to assemble and test, may be too complicated for the average user, or may encounter various problems endemic to twisted pair installations. For example, twisted pair installations may fail to transmit signals as expected because the effective cable length has been exceeded, because the cable routing and storage causes kinks (e.g., signal attenuation) in the twisted pair cable, or because the twisted pair wires are not connected to the correct modular connector pins. Twisted pair installation problems may be caused by human error during installation. For example, conventional installations may require an installer to sever a TRS plug from a TRS cable, expose and strip conductors in the TRS cable and modular cable, mate the conductors using soldering or crimp terminations, and cover the terminations using electrical tape or heat-shrink tubing. Such a manual process may be time consuming, difficult to complete behind a wall-mounted television, and may result in an unprofessional appearance. The problems encountered in twisted pair installations may also occur throughout device operation. For example, moving an installed twisted pair cable or modular connector may disconnect one or more of the modular connector internal pin connections. Use of a standardized device interface cable can help reduce these and other issues encountered with establishing device connections. For example, a typical installation time may be reduced to a few minutes using a standardized cable.

FIG. 1 illustrates a device interface cable assembly 100 with a straight connector according to an example described herein. As shown in FIG. 1, device interface cable assembly 100 includes an 8P8C female adapter 110. The 8P8C female adapter 110 may include a protective sheath 112, a textured surface 114, and strain relief 116 to improve durability and ease of use. Device interface cable assembly 100 may also include a 3.5 mm straight stereo plug 120. The stereo plug 120 may include three or more contacts. For example, stereo plug 120 may include a sleeve connector 122, a ring connector 124, and a tip connector 126. Various modular contacts (e.g., modular pins) on the 8P8C female adapter 110 may be electrically connected to contacts on the stereo plug 120. For example, modular pin 5 may be connected to sleeve connector 122, modular pin 2 may be connected to ring connector 124, and modular pin 3 may be connected to tip connector 126. The stereo plug 120 may also include a textured surface 128 and strain relief 129 to improve durability and ease of use. Device interface cable assembly 100 may also include a twisted pair cable 130 between the 8P8C female adapter 110 and the stereo plug 120, where the twisted pair cable 130 may be routed through strain relief 116 and 129 to the 8P8C female adapter 110 and the stereo plug 120.

One advantage of external control, such as with a home automation control system, is to provide direct access to advanced functions that the television can perform. For example, an IR remote may include dedicated control buttons for simple functions (e.g., volume or channel increment or decrement), whereas more complex television functions may require multiple button presses to navigate a menu. For example, to change the contrast on a television from a low contrast to a high contrast, a user may be required to navigate through a series of menus, possibly including a main menu, a display menu, a contrast menu, and an increasing or decreasing a scroll bar. In contrast, a direct control command connected through a television command interface may apply a setting directly, such as enacting a direct selection of contrast level of sixty percent. By applying settings directly, direct control from control systems and in particular home automation control systems may avoid the delays associated with manual or macro-based menu navigation, and may avoid interrupting a display with one or more on-screen menus.

The connections established with the device interface cable assembly 100 may be arranged to allow for two-way communication. For example, television transmit and receive contacts may be connected to receive and transmit control system device contacts, respectively. By allowing for two-way communication, the device interface cable assembly 100 may exchange signals from a controlled and controller device. Received signals may include information including acknowledgement of sent signals, status information, or other signals. Acknowledgement of sent signals may be especially useful when the controller is in a different location from the controlled device. Status information may be sent from the controlled device in response to a request for status, or may be sent in response to a command to change a setting or mode. For example, received signals may indicate the final position of a cursor or window in response to gestures representing relative or inertial movements (e.g., trackball movements, touchpad scrolling "flick" gestures, or pinch-and-zoom gestures). Additional status information may include power status, volume, mute state, channel number, input source (e.g., HDMI, RCA, coax), picture size, 3D status, picture mode, sound mode, or other status information.

The connections with the device interface cable assembly 100 may be selected and arranged to ensure transmit and receive controller contacts are connected to receive and transmit device contacts, respectively. This is in contrast to conventional audio cable connectors, where cables are arranged to connect ground pins together, left channel pins together, and right channel pins together. A failure to match the correct receive/transmit pinouts at both terminals of the cable will prevent commands from being properly transmitted and received.

Existing balun-type devices that are designed with 3.5 mm plugs on one side and male (or female) RJ45 connectors/jacks on the other and are designed to "extend" signals using 8-conductor Category-type cabling, include passive transformers in the signal path. The transformers in balun-type devices typically provide two functions. First, they provide ground isolation between the source and receiving components, thereby preventing audio ground loop noise in the signal. Additionally, such transformers are precisely tuned to a specific bandwidth. Analog audio transformers, for example, may pass signals between 20 Hz and 20 KHz, while similar digital audio transformers may pass signals between 1 MHz and 25 MHz. Thus, a passive audio balun utilizing transformers in the signal path would negatively affect a control signal such as a RS232 signal. (A RS232 serial control signals is not an audio signal, and a serial control signal generally operates at the high end (and above) the traditional audio spectrum). Depending on the inter-device baud rate, the transformers would very likely attenuate the control signals to a point that communication is prevented. The presently described device interface cable assembly 100 does not include this type of an audio transformer, and instead includes a pinout configuration to match the correct orientation of receive/transmit signals with electronic devices.

Figure 2:
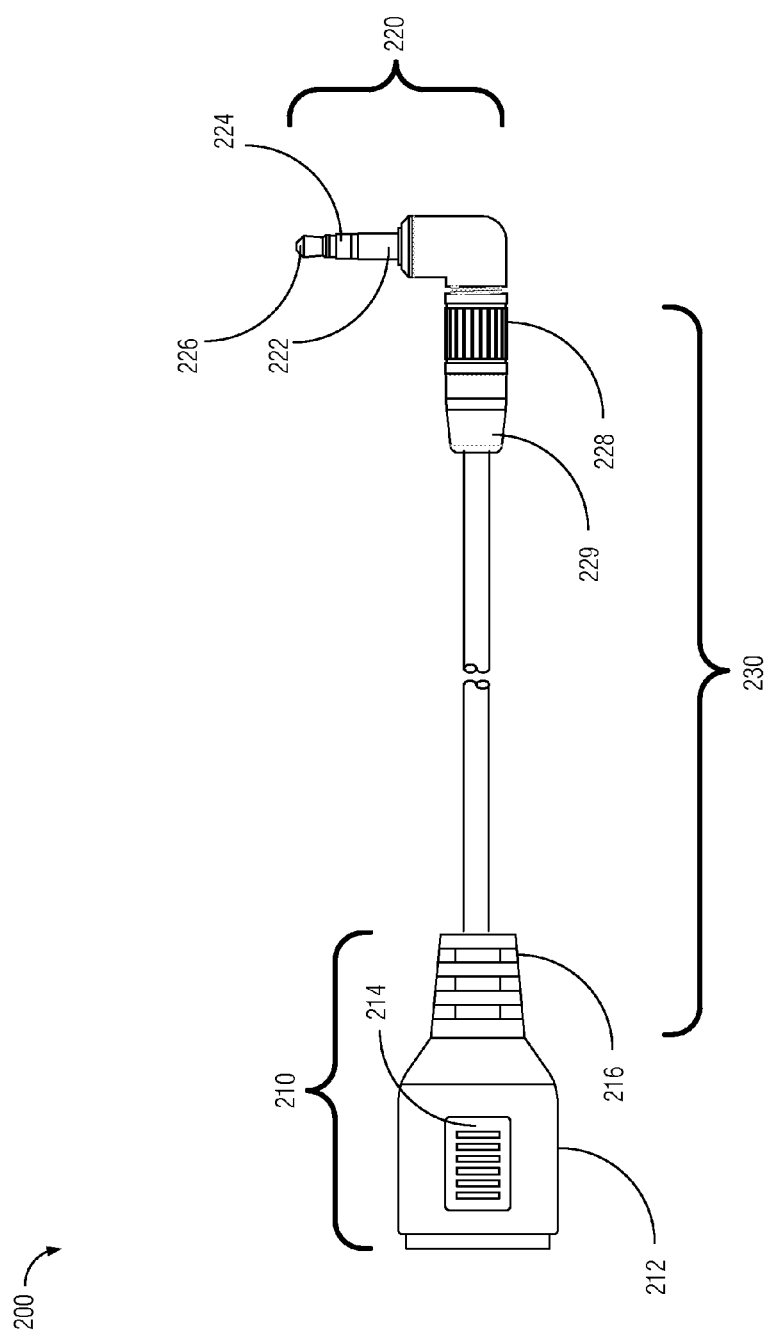
FIG. 2 illustrates a device interface cable assembly with a right angle connector according to an example described herein.

FIG. 2 illustrates a device interface cable assembly 200 with a right angle connector according to an example described herein. As shown in FIG. 2, device interface cable assembly 200 includes an 8P8C female adapter 210. The 8P8C female adapter 210 may include a protective sheath 212, a textured surface 214, and strain relief 216 to improve durability and ease of use. Device interface cable assembly 200 may also include a 3.5 mm right angle stereo plug 220. The stereo plug 220 may include three or more contacts. For example, stereo plug 220 may include a sleeve connector 222, a ring connector 224, and a tip connector 226. Various modular contacts (e.g., modular pins) on the 8P8C female adapter 210 may be electrically connected to contacts on the stereo plug 220. For example, modular pin 5 may be connected to sleeve connector 222, modular pin 2 may be connected to ring connector 224, and modular pin 3 may be connected to tip connector 226. The connections may be arranged to ensure transmit and receive controller contacts (e.g., home automation controller contacts) are connected to receive and transmit device contacts (e.g., television contacts), respectively. In other words, this is an arrangement similar to a "crossover" cable configuration. The stereo plug 220 may also include a textured surface 228 and strain relief 229 to improve durability and ease of use. Device interface cable assembly 200 may also include a twisted pair cable 230 between the 8P8C female adapter 210 and the stereo plug 220, where the twisted pair cable 230 may be routed through strain relief 216 and 229 to the 8P8C female adapter 210 and the stereo plug 220.

Figure 3:
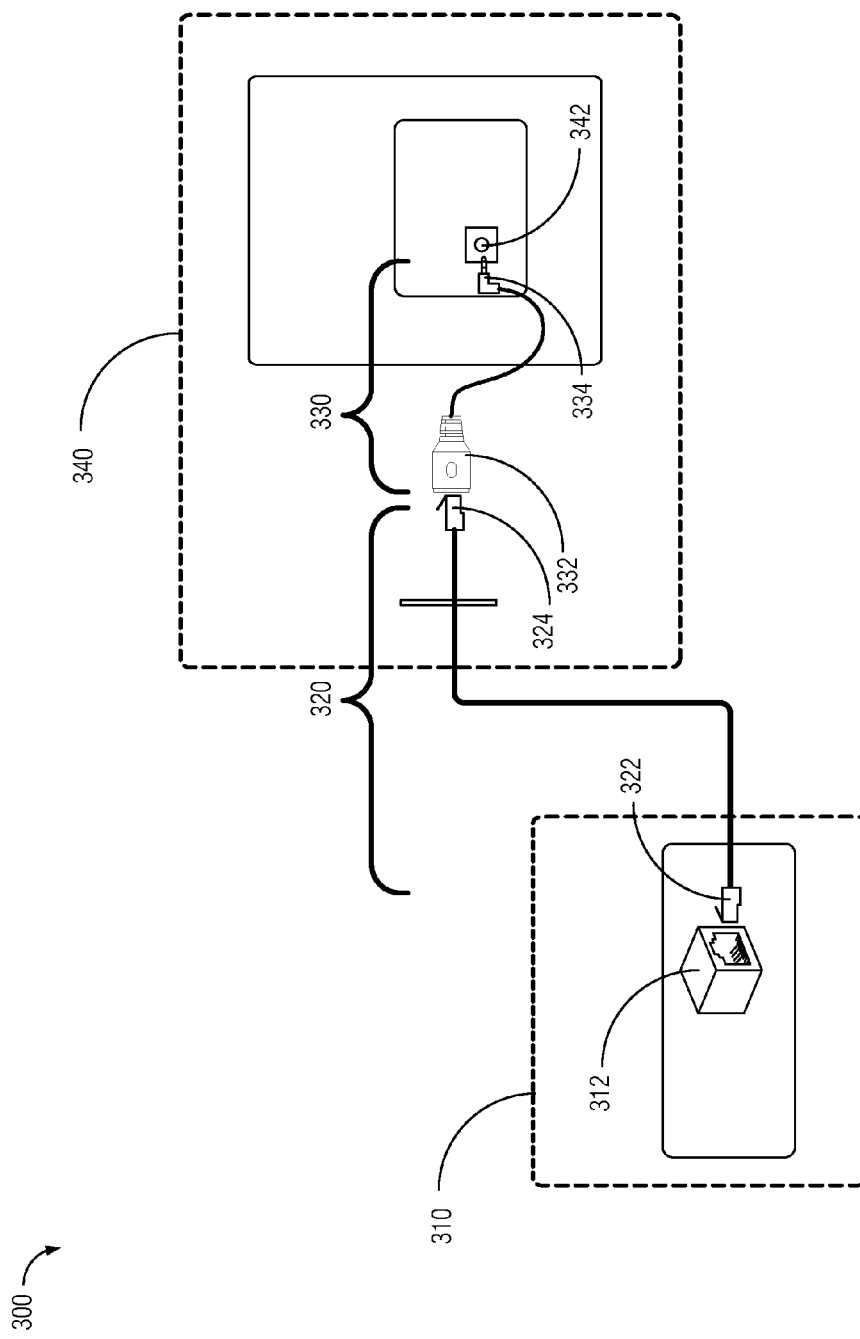
FIG. 3 illustrates a device control system using a modular cable and a device interface cable assembly according to an example described herein.

FIG. 3 illustrates a control system configuration 300 using a modular cable and a device interface cable assembly according to an example described herein. As shown in FIG. 3, a control system configuration 300 may include a controller interface 310, a modular cable 320, a cable assembly 330, and a television interface 340. The controller interface 310 may exchange control and information signals between the television 340 through the modular cable 320 and the cable assembly 330 using an RS-232-based serial protocol. The controller interface 310 may have an 8P8C port 312 that may be compatible with a standard modular 8P8C jack 322. The modular cable 320 may include a first 8P8C jack 322 and a second 8P8C jack 324, and may be connected between the 8P8C port 312 and the cable assembly 330. The cable assembly 330 may include an 8P8C port 332 and a stereo plug 334, and may be connected between the second 8P8C jack 324 and the television interface 340. The television interface 340 may include a stereo jack 342, and the cable assembly stereo plug 334 may be connected to the stereo jack 342.

Figure 4:
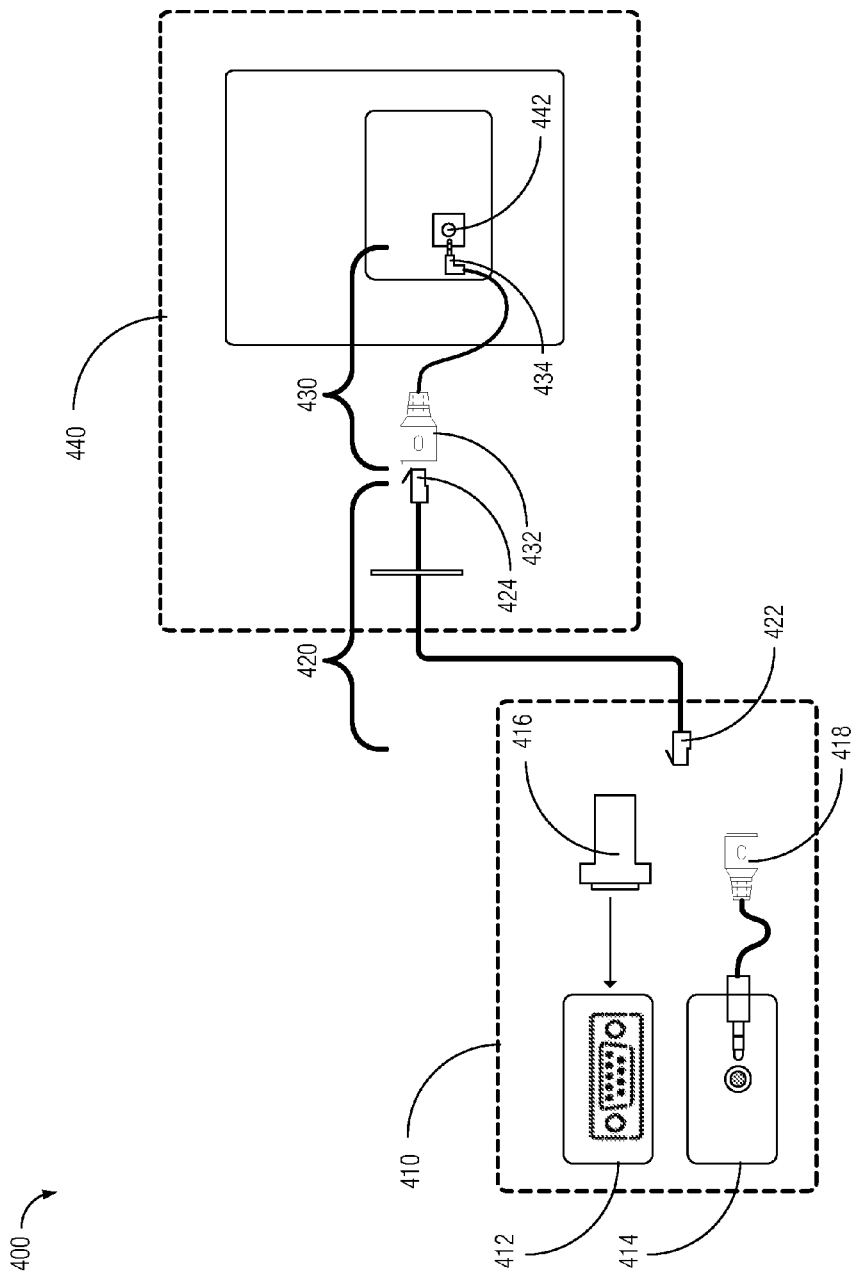
FIG. 4 illustrates a device control system using a modular cable, a device interface cable assembly, and a control system adapter according to an example described herein.

FIG. 4 illustrates a control system configuration 400 using a modular cable, a device interface cable assembly, and a control system adapter according to an example described herein. As shown in FIG. 4, the control system configuration 400 may include some of the components described above with respect to the control system configuration 300, and may include additional adapters or cables. For example, the control system configuration 400 may include a controller interface 410, a modular cable 420, a cable assembly 430, and a television interface 440. The controller interface 410 may exchange control and information signals using an RS-232-based serial protocol through a DB9 port 412 (also referred to as a DE-9 port), a 3.5 mm port 414, or other ports. To connect the controller interface 410 to a modular cable 420, a DB9-8P8C adapter 416 may be used to connect the DB9 port 412 with the modular cable 420, or a 3.5 mm-8P8C adapter 418 may be used to connect the 3.5 mm port 414 with the modular cable 420.

Whether using the DB9-8P8C adapter 416 or 3.5 mm-8P8C adapter 418, the adapter must be configured to ensure the three control signals on the 8P8C pins mate with the corresponding pins on the DB9 jack. Depending on whether the modular cable 420 is a pass-through (e.g., patch cable, straight through cable) or a crossover cable, the contacts on the 3.5 mm-8P8C adapter 418 may be configured identically with contacts on the cable assembly 430, or may be configured to swap transmit and receive contacts. For example, if a crossover cable is used for modular cable 420, the 3.5 mm-8P8C adapter 418 may be configured identically with contacts on the cable assembly 430. Alternatively, if a pass-through cable is used for modular cable 420, the 3.5 mm-8P8C adapter 418 may transpose transmit and receive contacts with respect to cable assembly 430 contacts, and the 3.5 mm-8P8C adapter 418 may be visually differentiated from the cable assembly 430 by color, size, shape, or other visual differentiation.

The modular cable 420 may include a first 8P8C jack 422 and a second 8P8C jack 424, and may be connected between the controller interface 410 and the cable assembly 430. The cable assembly 430 may include an 8P8C port 432 and a stereo plug 434, and may be connected between the second 8P8C jack 424 and the television 440. The television interface 440 may include a stereo jack 442, and the cable assembly stereo plug 434 may be connected to the stereo jack 442.

While many of the examples described herein refer to control systems and home automation device configurations, it will be understood that the techniques described herein may be deployed in a variety of internet-based or installed software interfaces on devices including set top boxes, network terminals, communication terminals, media players, watches, smart glasses, other wearable devices, or other types of various human-machine interfaces. The types of computing devices which may implement a home automation user interface may include a variety of desktop, portable, or mobile computing device form factors.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 5:
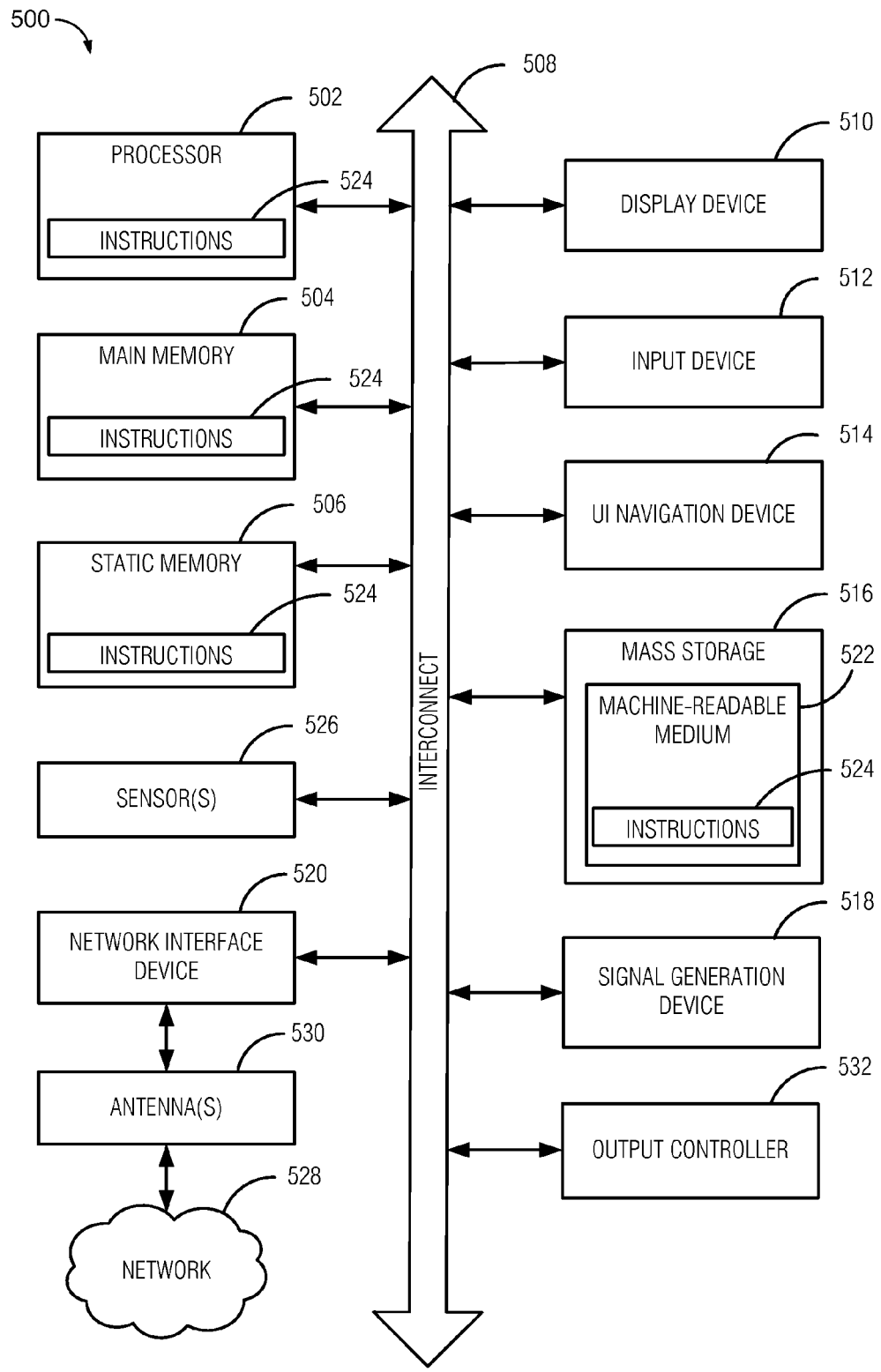
FIG. 5 is a block diagram illustrating a machine in the example form of a computer system, within which a set or sequence of instructions may be executed to cause the machine to perform any one of the methodologies discussed herein, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. Computer system machine 500 may be embodied by the controller interfaces 310, 410 or any other electronic processing or computing platform described or referred to herein.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via an interconnect 508 (e.g., a link, a bus, etc.). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touchscreen interface and touchscreen display. The computer system 500 may additionally include a storage device 516 (e.g., a drive unit), a signal generation device 518 (e.g., a speaker), an output controller 532, a network interface device 520 (which may include or operably communicate with one or more antennas 530, transceivers, or other wireless communications hardware), and one or more sensors 526, such as a global positioning system (GPS) sensor, compass, accelerometer, location sensor, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 528 using a transmission medium via the network interface device 520 utilizing any one of a number of well-known transfer protocols (e.g., HTTP). Examples of communications networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the configurations recited by the claims. Each of the examples in the claims may stand on its own, or may be combined in any permutation or combination with any one or more of the other examples provided below or throughout the present disclosure.

Example 1 includes system for interfacing with a controllable device, the system comprising a device interface cable assembly, a controllable device communicatively coupled to the device interface cable assembly, an external control system communicatively coupled through the device interface cable assembly to the controllable device, wherein the external control system is configured to send a plurality of command messages to the controllable device, and the external control system is configured to receive a plurality of status messages from the controllable device.

Example 2 includes the system of claim 1, further including a modular cable disposed between the external control system and the device interface cable assembly.

Example 3 includes the system of any of claims 1-2, wherein the modular cable assembly includes a transmit line, a receive line, and a ground line.

Example 4 includes the system of any of claims 1-3, wherein the device interface cable assembly includes modular connector.

Example 5 includes the system of any of claims 1-4, wherein the device interface cable assembly includes a device barrel connector.

Example 6 includes the system of any of claims 1-5, wherein the device barrel connector includes a distal device contact, a medial device contact, and a proximal device contact, wherein the proximal device contact is proximate the transmit line, the receive line, and the ground line.

Example 7 includes the system of any of claims 1-6, wherein the distal device contact is in electric communication with the transmit line, the medial device contact is in electric communication with the receive line, and the proximal device contact is in electric communication with the ground line.

Example 8 includes the system of any of claims 1-7, wherein the modular connector includes an eight position eight contact (8P8C) connector.

Example 9 includes the system of any of claims 1-8, wherein the modular connector includes a first contact in electric communication with the transmit line, a second contact in electric communication with the receive line, and a third contact in electric communication with the ground line.

Example 10 includes the system of any of claims 1-9, further including a crossover cable assembly disposed between the modular cable and the external control system.

Example 11 includes the system of any of claims 1-10, wherein the crossover cable assembly includes a crossover barrel connector, the crossover barrel connector includes a distal crossover contact, a medial crossover contact, and a proximal crossover contact, and the proximal crossover contact is proximate the modular cable.

Example 12 includes the system of any of claims 1-11, wherein when the modular cable is connected between the crossover cable assembly and the device interface cable assembly, the distal crossover contact is in electric communication with the medial device contact, the medial crossover contact is in electric communication with the distal device contact, and the proximal crossover contact is in electric communication with the proximal device contact.

Example 13 includes the system of any of claims 1-5, wherein the modular connector, modular cable, and barrel connector are housed within a single molded housing.

Example 14 includes a system for interfacing with a controllable device, the system comprising a device interface cable assembly, a controllable device communicatively coupled to the device interface cable assembly, an external control system communicatively coupled through the device interface cable assembly to the controllable device, wherein the external control system is configured to send a plurality of command messages to the controllable device, and the external control system is configured to receive a plurality of status messages from the controllable device.

Example 15 includes the system of claim 14, further including a modular cable disposed between the external control system and the device interface cable assembly.

Example 16 includes the system of any of claims 14-15, wherein the device interface cable assembly includes a modular connector, a device barrel connector, and a device cable including at least three conductive wires disposed between the modular connector and the device barrel connector.

Example 17 includes the system of any of claims 14-16, wherein the device barrel connector includes a distal device contact, a medial device contact, and a proximal device contact, wherein the proximal device contact is proximate the device cable.

Example 18 includes the system of any of claims 14-17, further including a crossover cable assembly disposed between the modular cable and the external control system.

Example 19 includes the system of any of claims 14-18, wherein the crossover cable assembly includes a crossover barrel connector, the crossover barrel connector includes a distal crossover contact, a medial crossover contact, and a proximal crossover contact, and the proximal crossover contact is proximate the modular cable.

Example 20 includes the system of any of claims 14-19, wherein when the modular cable is connected between the crossover cable assembly and the device interface cable assembly the distal crossover contact is in electric communication with the medial device contact, the medial crossover contact is in electric communication with the distal device contact, and the proximal crossover contact is in electric communication with the proximal device contact.

Example 21 includes the system of claim 14, wherein the modular connector, device barrel connector, and device cable are contained within a single molded housing.

Example 22 includes a device interface cable assembly, the device comprising a modular connector, a device barrel connector, and a device cable including at least three conductive wires disposed between the modular connector and the device barrel connector.

Example 23 includes the device of claim 22, wherein the device barrel connector includes a distal device contact, a medial device contact, and a proximal device contact, wherein the proximal device contact is proximate the device cable.

Example 24 includes the device of any of claims 22-23, wherein the at least three conductive wires includes a transmit line, a receive line, and a ground line.

Example 25 includes the device of any of claims 22-24, wherein the distal device contact is in electric communication with the receive line, the medial device contact is in electric communication with the transmit line, and the proximal device contact is in electric communication with the ground line.

Example 26 includes the device of any of claims 22-25, wherein the modular connector includes an eight position eight contact (8P8C) connector, and wherein the modular connector includes a first modular contact in electric communication with the transmit line, a second modular contact in electric communication with the receive line, and a third modular contact in electric communication with the ground line.

Example 27 includes the device of claim 22, wherein the modular connector, device barrel connector, and device cable are contained within a single molded housing.

Example 28 includes a method of using a device interface cable assembly, the method comprising sending a command from an external control system though a device interface cable assembly to a controllable device, wherein the device interface cable assembly includes a modular connector, a device barrel connector, and a device cable including at least three conductive wires disposed between the modular connector and the device barrel connector.

Example 29 includes the method of claim 28, wherein the device barrel connector includes a distal device contact, a medial device contact, and a proximal device contact, wherein the proximal device contact is proximate the device cable.

Example 30 includes the method of any of claims 28-29, wherein the at least three conductive wires includes a transmit line, a receive line, and a ground line, the distal device contact is in electric communication with the receive line, the medial device contact is in electric communication with the transmit line, and the proximal device contact is in electric communication with the ground line.

Example 31 includes the method of any of claims 28-30, wherein the modular connector includes an eight position eight contact (8P8C) connector, and wherein the modular connector includes a first modular contact in electric communication with the transmit line, a second modular contact in electric communication with the receive line, and a third modular contact in electric communication with the ground line.

Example 32 includes the device of any of claims 28-31, wherein the modular connector, device barrel connector, and device cable are contained within a single molded housing.

What is claimed is:

1. A system for interfacing with a controllable device, the system comprising:
   a device interface cable assembly, wherein the device interface cable assembly includes a device cable, a device barrel connector plug disposed at a first end of the device cable, and an eight position eight contact (8P8C) connector disposed at a second end of the device cable, wherein the device cable includes at least three conductive wires disposed between the 8P8C connector and the device barrel connector plug, and wherein the 8P8C connector includes:
      a first modular contact in electric communication with a transmit line wire of the device cable;
      a second modular contact in electric communication with a receive line wire of the device cable; and a third modular contact in electric communication with a ground line wire of the device cable;
a controllable device communicatively coupled to the device interface cable assembly; and
an external control system communicatively coupled through the device interface cable assembly to the controllable device, wherein:
the external control system is configured to send a plurality of command messages to the controllable device; and
the external control system is configured to receive a plurality of status messages from the controllable device.

2. The system of claim 1, further including a modular cable disposed between the external control system and the device interface cable assembly.

3. The system of claim 2, wherein the device barrel connector plug includes a distal device contact, a medial device contact, and a proximal device contact, wherein the proximal device contact is proximate the device cable.

4. The system of claim 3, further including a device interface crossover cable assembly disposed between the modular cable and the external control system.

5. The system of claim 4, wherein:
the device interface crossover cable assembly includes a crossover barrel connector plug;
the crossover barrel connector plug includes a distal crossover contact, a medial crossover contact, and a proximal crossover contact; and
the proximal crossover contact is proximate the modular cable.

6. The system of claim 5, wherein when the modular cable is connected between the device interface crossover cable assembly and the device interface cable assembly:
the distal crossover contact is in electric communication with the medial device contact;
the medial crossover contact is in electric communication with the distal device contact; and
the proximal crossover contact is in electric communication with the proximal device contact.

7. The system of claim 2, wherein the 8P8C connector, device barrel connector plug, and device cable are contained within a single molded housing.

8. A device interface cable assembly, the device interface cable assembly comprising:
a modular connector;
a device barrel connector plug; and
a device cable including at least three conductive wires disposed between the modular connector and the device barrel connector plug, wherein the at least three conductive wires includes a transmit line wire, a receive line wire, and a ground line wire;
wherein the modular connector includes an eight position eight contact (8P8C) connector, and wherein the modular connector includes:
a first modular contact in electric communication with the transmit line wire;
a second modular contact in electric communication with the receive line wire; and
a third modular contact in electric communication with the ground line wire.

9. The device interface cable assembly of claim 8, wherein the device barrel connector plug includes a distal device contact, a medial device contact, and a proximal device contact, wherein the proximal device contact is proximate the device cable.

10. The device interface cable assembly of claim 8, wherein the distal device contact is in electric communication with the receive line wire, the medial device contact is in electric communication with the transmit line wire, and the proximal device contact is in electric communication with the ground line wire.

11. The device interface cable assembly of claim 8, wherein the modular connector, device barrel connector plug, and device cable are contained within a single molded housing.

12. A method of using a device interface cable assembly, the method comprising:
sending a command from an external control system through the device interface cable assembly to a controllable device, wherein the device interface cable assembly includes:
a modular connector;
a device barrel connector plug; and
a device cable including at least three conductive wires disposed between the modular connector and the device barrel connector plug, wherein the at least three conductive wires includes a transmit line wire, a receive line wire, and a ground line wire;
wherein the modular connector includes an eight position eight contact (8P8C) connector; and wherein the modular connector includes:
a first modular contact in electric communication with the transmit line wire of the device cable;
a second modular contact in electric communication with the receive line wire of the device cable; and
a third modular contact in electric communication with the ground line wire of the device cable.

13. The method of claim 12, wherein the device barrel connector includes a distal device contact, a medial device contact, and a proximal device contact, wherein the proximal device contact is proximate the device cable.

14. The method of claim 13, wherein:
the distal device contact of the device barrel connector plug is in electric communication with the receive line wire;
the medical device contact of the device barrel connector plug is in electric communication with the transmit line wire; and
the proximal device contact of the device barrel connector plug is in electric communication with the ground line wire.

15. The method of claim 12, wherein the modular connector, the device barrel connector plug, and the device cable are contained within a single molded housing.

16. The method of claim 12, the method further comprising:
receiving information from the controllable device through the device interface cable assembly at the external control system.

* * * * *